(12) United States Patent
Wang et al.

(10) Patent No.: US 11,521,377 B1
(45) Date of Patent: Dec. 6, 2022

(54) LANDSLIDE RECOGNITION METHOD BASED ON LAPLACIAN PYRAMID REMOTE SENSING IMAGE FUSION

(71) Applicants: Nanjing University of Information Science & Technology, Nanjing (CN); National Climate Center, Beijing (CN)

(72) Inventors: Guojie Wang, Nanjing (CN); Zhen Dong, Baoying County (CN); Zifan Liang, Nanjing (CN); Aiqing Feng, Beijing (CN); Guofu Wang, Beijing (CN); Yanjun Wang, Nanjing (CN); Buda Su, Beijing (CN)

(73) Assignees: NANJING UNIVERSITY OF INFORMATION SCI. & TECH., Nanjing (CN); NATIONAL CLIMATE CENTER, Beijing (CN)

( * ) Notice: Subject to any disclaimer, the term of this patent is extended or adjusted under 35 U.S.C. 154(b) by 0 days.

(21) Appl. No.: 17/876,458

(22) Filed: Jul. 28, 2022

(30) Foreign Application Priority Data

Oct. 26, 2021 (CN) .......................... 202111244196.5

(51) Int. Cl.
*G06V 10/00* (2022.01)
*G06V 20/10* (2022.01)
(Continued)

(52) U.S. Cl.
CPC .............. *G06V 20/10* (2022.01); *G06T 3/40* (2013.01); *G06V 10/50* (2022.01); *G06V 10/778* (2022.01); *G06V 10/806* (2022.01); *G06V 20/70* (2022.01)

(58) Field of Classification Search
CPC ........ G06K 9/6256; G06N 20/00; G06N 3/08; G06N 3/0454; G06T 2207/20016;
(Continued)

(56) References Cited

U.S. PATENT DOCUMENTS 8,649,606 B2 * 2/2014 Zhao .................... G06V 10/451
607/54
10,769,744 B2 * 9/2020 Poudel Karmatha .. G06V 20/58

FOREIGN PATENT DOCUMENTS

CN      108537238 A    9/2018
CN      113408462 A    9/2021

OTHER PUBLICATIONS

CNIPA, Notification of a First Office Action for CN202111244196.5, dated Dec. 2, 2021.
(Continued)

*Primary Examiner* — Li Liu
(74) *Attorney, Agent, or Firm* — Hemisphere Law, PLLC; Zhigang Ma

(57) ABSTRACT

A landslide recognition method based on Laplacian pyramid remote sensing image fusion includes: performing original remote sensing image reconstruction based on extracted local features and global features of remote sensing images through a Laplacian pyramid fusion module to generate a fused image, constructing a deep learning semantic segmentation model through a semantic segmentation network, labeling the fused image to obtain a dataset of landslide disaster label map, and training the deep learning semantic segmentation model by the dataset, and then storing when a loss curve is fitted and a landslide recognition accuracy of remote sensing image of the deep learning semantics segmentation model meets a requirement by modifying a structure of the semantic segmentation network and adjusting parameters of the deep learning semantics segmentation model. Combined with the image fusion model based on Laplacian pyramid, the method can provide effective decision-making basis for prevention and mitigation of landslide disasters.

2 Claims, 2 Drawing Sheets

(51) Int. Cl.
*G06V 10/80* (2022.01)
*G06V 10/778* (2022.01)
*G06T 3/40* (2006.01)
*G06V 20/70* (2022.01)
*G06V 10/50* (2022.01)

(58) Field of Classification Search
CPC . G06T 2207/20081; G06T 2207/20084; G06T 7/11; G06V 10/774; G06V 10/82; G06V 20/58
See application file for complete search history.

(56) References Cited

OTHER PUBLICATIONS

Nanjing University of Information Science and Technology (Applicant), Reply to Notification of a First Office Action for CN202111244196.5, w/ allowed replacement claims, dated Dec. 9, 2021.

CNIPA, Notification to grant patent right for invention in CN202111244196.5, dated Jan. 12, 2022.

* cited by examiner

LANDSLIDE RECOGNITION METHOD BASED ON LAPLACIAN PYRAMID REMOTE SENSING IMAGE FUSION

TECHNICAL FIELD

The invention relates to the field of landslide recognition methods, in particularly to a landslide recognition method based on Laplacian pyramid remote sensing image fusion.

BACKGROUND

As one of most dangerous natural disasters, landslide is generally defined as a natural phenomenon that soil or rock on the slope slides downwards under the action of gravity under influences of river scouring, earthquake and other factors, which often occurs in mountainous and hilly areas. Landslide disaster has strong destructive power and thus poses a great threat to ecological environment, transportation and construction land, resulting in huge casualties and property losses, and therefore it is necessary to monitor landslides in real time to reduce losses. However, it is difficult to systematically recognize landslides because of their unpredictable occurrence, dispersed distribution and complex terrain in the disaster area. In recent years, with the rapid development of remote sensing technology, more and more satellite remote sensing images can be applied to the recognition of landslide disaster. However, many remote sensing satellites are limited by temporal and spatial resolutions, which makes it difficult to accurately obtain features of landslides. For example, time-sensitive satellites are difficult to meet the requirements of obtaining high spatial resolution images; and ordinary optical remote sensing satellites have weak penetrability and thus cannot accurately obtain surface conditions of disaster areas. Therefore, a multi-source remote sensing satellite image fusion technology can comprehensively make use of remote sensing images from different sources, improve the spatial resolution by fusing multi-source images, and thereby achieve more accurate observation of the earth's surface. However, for landslide disaster monitoring, a commonly used means is interpreting landslide points in remote sensing images by experts and using an image classification algorithm to automatically classify the images to thereby recognize locations of landslides.

However, the above related art still has shortcomings as follows: 1. the accuracy of existing remote sensing landslide recognition method is not high, it is difficult to exceed 90%, and limited by available data and other factors; 2. due to different observation dimensions, temporal, spatial and spectral resolutions of multi-source remote sensing images are different, which makes information redundant and cannot make full use of the advantages of multi-source data, and moreover algorithms based on image fusion generally have serious spatial and spectral distortion problems.

SUMMARY

INVENTION PURPOSE: a purpose of the invention is to provide a method of remote sensing images fusion based on Laplacian pyramid and landslide recognition, which can make full use of spatio-temporal information of remote sensing images to improve the accuracy of landslide recognition.

TECHNICAL SOLUTION: a landslide recognition method according to the invention may include steps:

S1, performing original remote sensing image reconstruction based on extracted remote sensing image local features and remote sensing image global features through a Laplacian pyramid fusion module to generate a fused image, S2, constructing a deep learning semantic segmentation model through a semantic segmentation network based on parallel structure;

S3, labeling a place where landslide disaster occurs and a place where landslide disaster does not occur in the fused image through an image labeling tool to obtain a dataset of landslide disaster label map; and S4, training the deep learning semantic segmentation model by the dataset obtained in the S3, and storing the deep learning semantic segmentation model when a loss curve of the deep learning semantics segmentation model is fitted and a landslide recognition accuracy of remote sensing image of the deep learning semantics segmentation model meets a requirement by modifying a structure of the semantic segmentation network and adjusting parameters of the deep learning semantics segmentation model. Moreover, in an embodiment, the landslide recognition method further includes: applying the trained deep learning semantic segmentation model to recognition of landslide disaster to provide a decision-making basis for prevention and mitigation of landslide disaster.

In an embodiment, an implementation process of the S1 includes:

S11, designing an image block feature extractor according to a size of each of remote sensing images, dividing each of the remote sensing images into a series of sub-images, and inputting the series of sub-images into the image block feature extractor to perform feature extraction on each of the series of sub-images and thereby complete extraction of the remote sensing image local features;

S12, downscaling each of the remote sensing images of different sources by downsampling once to obtain a downscaled image with a size being one quarter of the size of the remote sensing image, encoding the downscaled image, repeatedly performing the operations of downscaling and encoding until a resultant downscaled image has a size same as a size of each of the series of sub-images in the S11, and upsampling features corresponding to different scales to the size of the remote sensing image to thereby obtain the extracted remote sensing image global features; and S13, inputting the remote sensing image local features extracted in the S11 and the remote sensing image global features extracted in the S12 into the Laplacian pyramid fusion module, and performing the original remote sensing image reconstruction through an image reconstruction auto-encoder network.

In an embodiment, in the step S2, a main body of the semantic segmentation network includes four phases, one stream is added at bottom when each time one phase is expanded, each stream of the semantic segmentation network represents a processing of high-resolution to low-resolution has been operated, a next stage is composed of a previous stream and another stream reduced to half in size, and multi-resolution fusion and information exchange are performed before each time of the downsampling;

all low-resolution features are upsampled to a resolution same as that of a first stream to obtain upsampled features, and the upsampled features are concatenated to obtain a feature map for semantic segmentation; and an implementation process includes:

S21, reducing an input image in resolution to ¼ of its original size through a convolution with a step size of 2 as input of a first phase of the four phases, a resolution of a bottommost stream after subsequent three times of resolution reduction being ⅟32 of the original size, and a fourth phase of the four phases including four feature maps with different resolutions being ¼, ⅛, ⅟16 and ⅟32 of the original size;

S22, in the fourth phase, fusing feature representations of four different resolutions to realize image feature enhancement and restoring the feature representations of four different resolutions to the same resolution of the first phase by upsampling to obtain restored four feature representations with the same resolution, the same resolution being ¼ of the original size; and S23, concatenating the restored four feature representations with the same resolution obtained in the fourth phase through a 1×1 convolution, and then obtaining a segmentation result with the same size as input of the whole semantic segmentation network through four times of upsampling;

In an embodiment, an implementation process of the S3 includes:

S31, performing preprocessing works including radiometric calibration, geometric correction and logarithmic conversion on a selected remote sensing image pair;

S32, labeling the fused image through the image labeling tool to label the place where landslide disaster occurs and the place where landslide disaster does not occur in the fused image, and thereby obtaining a landslide disaster label map; and S33, cropping the landslide disaster label map obtained after the labeling according to a channel size of the semantic segmentation network, and deleting a label not including landslide in the landslide disaster label map to obtain the dataset of landslide disaster label map.

Compared with prior art, the invention may achieve the following beneficial effects that: 1. by combining Laplacian pyramid based image fusion in deep learning, the semantic segmentation model, Gaofen-2 (GF-2 satellite) data with high spatial resolution, and data of Sentinel-1 (satellite) which is not affected by time and weather and has strong penetrability, the invention can solve problems such as difficult data acquisition and low recognition accuracy when landslide disaster occurs; 2. the invention provides a method of multi-source remote sensing images fusion based on Laplacian pyramid and landslide recognition, which can efficiently and accurately provide an effective decision-making basis for landslide disaster prevention and mitigation.

DETAILED DESCRIPTION OF EMBODIMENTS

Figure 1:
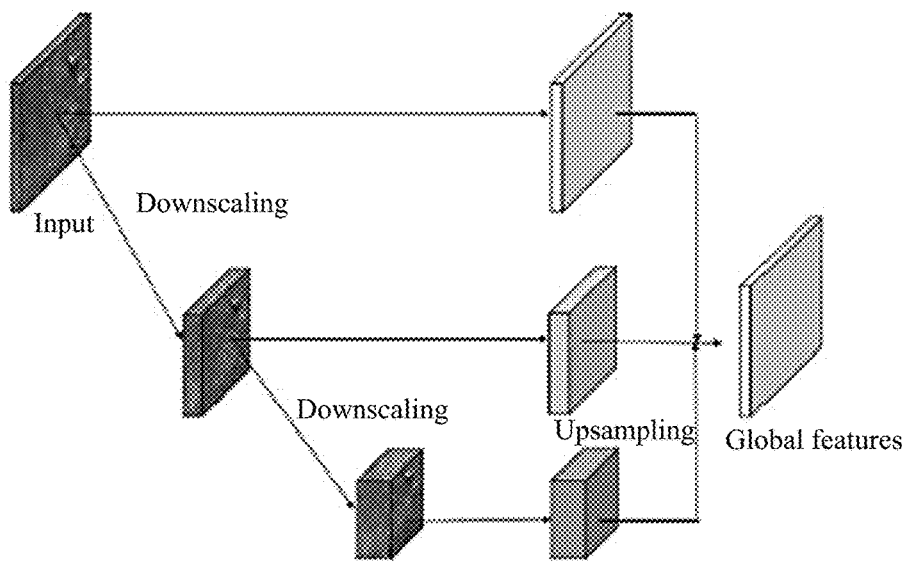
FIG. 1 illustrates a schematic view of a pyramid structure based global feature extraction according to the invention.

The invention will be further described in detail below in combination with the accompanying drawings and concrete embodiments.

A landslide recognition method according to an embodiment of the invention effectively fuses multi-source remote sensing images to realize image enhancement, and then uses a deep learning semantic segmentation network to accurately monitor landslide disaster. An image fusion and a semantic segmentation technology in deep learning are employed as a research framework, in which a multi-source remote sensing image fusion module and a landslide recognition module are included. Firstly, the multi-source remote sensing image fusion module is used to extract non-local information from the whole images to obtain multi-scale, multi-dimensional and multi-angle features of original images, and the features then are used to reconstruct input images to enhance a difference of adjacent surface features in the original images, so as to obtain a high-resolution remote sensing image which can better distinguish the surface features; secondly, the landslide recognition module can effectively learn a change of an object in the high-resolution remote sensing image and make full use of spatio-temporal information by using the semantic segmentation technology, so as to achieve a purpose of accurate recognition of landslide disaster.

An implementation of the method according to the embodiment of the invention mainly includes three parts as follows: fusion of microwave image of Sentinel-1 (satellite) with visible light image of Gaofen-2 (GF-2 satellite) based on Laplacian pyramid, landslide disaster labeling based on high-resolution fused remote sensing image, and landslide rapid recognition based on deep learning semantic segmentation model. Specific steps of the method may be as follows.

Step 1, fusion of multi-source remote sensing images based on Laplacian pyramid

(11) remote sensing image local feature extraction

In order to extract local features of a Gaofen-2 image and a Sentinel-1 image, each the image is divided into several sub-images with an appropriate size, and then relevant features of all pixels in the sub-images are calculated to obtain local features of the remote sensing images after the dividing. The obtained local features can be used for original image reconstruction.

Because of a huge amount of data for a remote sensing image, it is difficult to obtain image features directly. In order to extract low-level local visual feature representations of the remote sensing images, an image block feature extractor is designed according to a size of each the image, the input Gaofen-2 image and Sentinel-1 image each are cut into a series of small-size sub-images, and feature extraction is performed on each sub-image to calculate correlation between all pixels in each sub-image and the corresponding sub-image to thereby extract local feature representations of each the remote sensing image, as shown in below formula (1); and these local feature representations can be subsequently used for original remote sensing image reconstruction.

$$F=[f0,f1,f2,\ldots,fi] \tag{1}$$

where, F represents remote sensing image features, and fi represents sub-image features.

(12) remote sensing image global feature extraction

A Laplacian pyramid fusion module is designed to obtain local-to-global feature information of an input image, and an implementation process may be that: performing a downscaling operation on an original input remote sensing image by downsampling, making an image size be changed into one quarter of an initial image size after every time downsampling is performed, encoding downscaled images of different scales through a pyramid structure to obtain non-local features of the whole image, i.e., obtain a series of multi-scale, multi-dimensional and multi-angle global features of original image, and the image features corresponding to different scales after downsampling are integrated into global features with original image size through upsampling, and FIG. 1 illustrates a schematic view of pyramid structure based global feature extraction.

Figure 2:
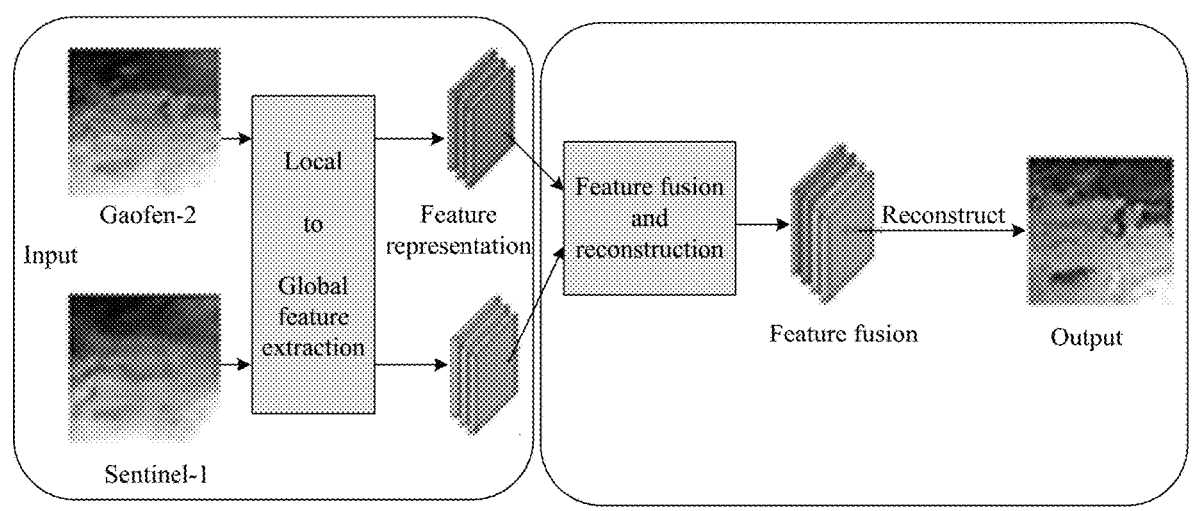
FIG. 2 illustrates a schematic view of a framework of a remote sensing image fusion model according to the invention.

FIG. 2 illustrates a schematic view of a framework of a remote sensing image fusion model, and a downscaling pyramid module is used to realize feature extractions of local-to-global of the remote sensing images: firstly, two input remote sensing images of different sources each are downsampled (i.e., downscaled) once, so that a size of the downsampled image becomes one quarter of that of the original image; then, the downscaled image is encoded; afterwards, the operations of downscaling and encoding are repeatedly performed until that image has the same size as the sub-image in the above step (11); and finally features corresponding to different scales are upsampled to the original image size.

(13) reconstruction of image remote sensing image features

Original remote sensing image reconstruction is performed based on the local information and global features of the remote sensing images extracted in the above steps (11) and (12) through an image reconstruction autoencoder network. A main purpose of the image fusion task is to generate a fused image containing as much useful information as possible by using the Gaofen-2 image and the sentinel-1 image.

After the local and global features extracted from the Gaofen-2 image and the Sentinel-1 image are input into the Laplacian pyramid fusion module, twin network structures with the same encoder module are used to extract a series of high-dimensional features of the original remote sensing images. The high-dimensional features include information such as edge, texture, color and sememe of the original image. Finally, these high-dimensional features are used to fuse and reconstruct the original images, so that a high-resolution remote sensing image combining optical and microwave images is obtained.

Step 2, construction of semantic segmentation model based on deep learning

Figure 3:
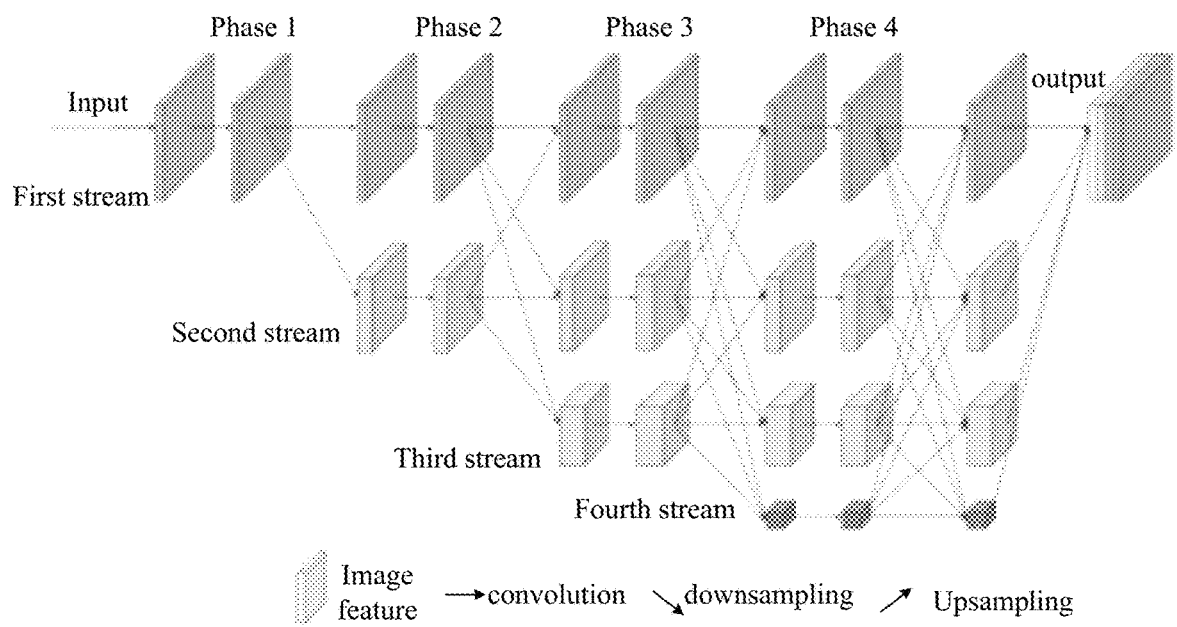
FIG. 3 illustrates a schematic framework of a semantic segmentation model based on deep learning according to the invention.

FIG. 3 illustrates a schematic view of a framework of a constructed semantic segmentation network HRNet based on parallel structure. A main body of the HRNet contains four downsampling phases, and when each time one phase is expanded, one stream is added at bottom. One stream of the network represents a processing of high-resolution to low-resolution has been operated, so that a next stage is composed of the previous stream and another stream reduced to half in size. Before each downsampling operation, multi-resolution feature fusion and information exchange are performed to improve corresponding resolution features. The last four streams constitute the fourth phase, which are fully fused in the last multi-resolution fusion to generate a better feature map. All low-resolution features will be upsampled to the same resolution as the first stream, and the upsampled features (i.e., four features with the same resolution) will be concatenated to obtain a final feature map for semantic segmentation. A detailed implementation process is as follows.

(21) First, reducing an input image in resolution to ¼ of its original size through a convolution with a step size of 2, as input of the first phase of HRNet. After three times of subsequent downscaling in resolution, a resolution of the bottommost stream becomes 1/32 of the original size. Therefore, the fourth phase includes four feature maps of different resolutions, which are ¼, ⅛, 1/16 and 1/32, respectively.

(22) Between each two phases, multi-resolution feature fusion is used to exchange information from multi-resolution features. In the fourth phase, four feature representations of different resolutions are fused, and the image features are enhanced by the last multi-resolution feature fusion, and then the four feature representations of different resolutions all are restored to the same resolution as the first phase, i.e., ¼ of the original size, by upsampling.

(23) The restored four feature representations of the same resolution in the fourth phase are concatenated through 1×1 convolution to obtain a final remote sensing image feature map and generate a segmentation result. Finally, four times of upsampling are used to obtain the resultant segmentation result with the same size as input of the whole network.

Figure 4:
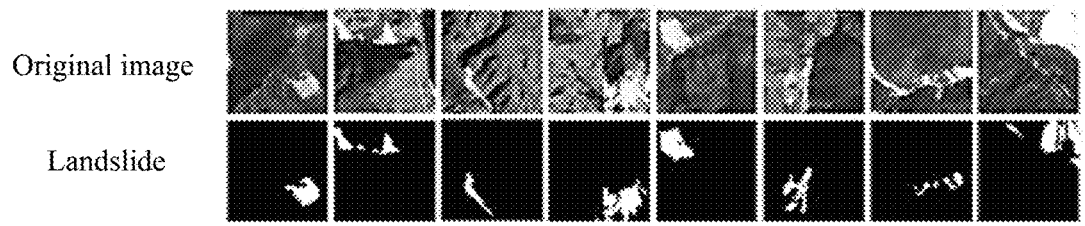
FIG. 4 illustrates a schematic view of remote sensing landslide datasets according to the invention, in which the first line shows original remote sensing images, and the second line shows corresponding landslide labels.

Step 3, landslide disaster labeling based on high-resolution fused remote sensing image In order to meet various application scenes and monitor landslide disasters in different areas and different times, a remote sensing image pair with wide spatial range and long time-span is selected to make landslide disaster labels with strong generalization capability. Firstly, remote sensing images before fusion are preprocessed by radiometric calibration, geometric correction and logarithmic conversion, and then the high-quality remote sensing image obtained after fusion is labeled through an image labeling tool, a place where landslide disaster occurs in the fused image is marked as white, and a place where landslide disaster does not occur is labeled as black, as shown in FIG. 4. Finally, a landslide label map with the same size as the original image is obtained. A detailed implementation process may be as follows.

(31) In order to meet data samples with good time and space generalization, so that it can be applied to landslide recognition in different areas and different seasons. Gaofen-2 and Sentinel-1 remote sensing images with wide spatial range and long time-span are selected and preprocessed including radiometric calibration, geometric correction, logarithmic conversion and so on.

(32) According to changed features in the remote sensing image when landslide occurs, landslide areas in the image are marked manually by visual interpretation, the fused high-quality remote sensing image (namely the high-resolution remote sensing image combining optical and microwave images obtained after original image reconstruction) is labeled by image processing software such as PS or the like, and the place where the landslide disaster occurs in the remote sensing image is labeled as white, the place where without the occurrence of landslide is labeled as black, and finally the landslide disaster label image with the same size as the original image is obtained.

(33) According to a channel size of the semantic segmentation network, the labeled landslide disaster label image is cropped; and a high-resolution landslide disaster label set (i.e., a dataset composed of landslide disaster label images) is screened to improve the model training efficiency, and the label not including landslide is deleted to reduce data loading time during network training.

According to the method, the image fusion technology based on Laplacian pyramid is used to combine the data of the Gaofen-2 and sentinel-1 satellites to improve the spatial resolution of original images, enhance the image information and enhance the difference of adjacent surface features in the image, so that surface feature objects in the image can be better distinguished. By combining the high-resolution optical remote sensing data and the microwave remote sensing data with strong penetrability, features of landslides in the remote sensing image can be effectively highlighted, thus providing research data for landslide disaster recognition and monitoring.

Step 4, landslide recognition based on deep learning semantic segmentation model The deep learning semantic segmentation model is trained based on the high-resolution landslide disaster label set, and by modifying the framework structure of the semantic segmentation network and adjusting parameters such as learning rate, regularization and iteration cycle of the deep learning network model until a loss curve of the model is fitted and close to 0 and the landslide recognition accuracy of remote sensing image reaches 95% or more, it is considered that the model has the ability of efficiently and accurately recognizing landslides.

Figure 5:
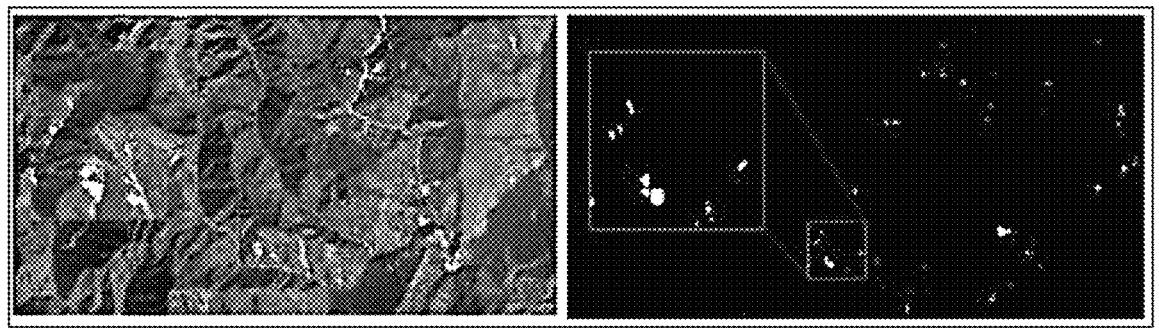
FIG. 5 illustrates a recognition result diagram of landslide disaster based on a trained deep learning semantic segmentation model according to the invention.

The deep learn semantic segmentation model is trained based on the high-resolution landslide disaster label set obtained in the step 3, and then can be applied to landslide disaster recognition in different areas and different time phases. The high-resolution landslide disaster labels produced in the above step (32) integrate the advantages of optical remote sensing and microwave remote sensing, have both the high spatial resolution of optical remote sensing and the strong penetrability of microwave remote sensing, and thus can better highlight the difference between adjacent objects in the remote sensing image, so as to highlight the features of landslides. As shown in FIG. 5, it is a recognition result diagram of a landslide disaster based on the trained deep learning semantic segmentation model.

In summary, the invention can quickly and accurately position landslide locations in a remote sensing image, and obtain a disaster area caused by the landslides in the area. It can provide a method and data for monitoring landslide disasters, and meanwhile provide decision-making basis for disaster prevention and relief. Combined with a land coverage map of the disaster area, loss areas of different surface types of ground caused by landslides in the disaster area can be obtained, so as to quantitatively analyze the loss caused by the landslide disaster. According to the landslide distribution map of disaster area obtained in the step 4 in combination with the surface coverage type data of disaster area, the landslide disaster situation can be analyzed, which can obtain the loss areas of different surface types caused by landslides to quantitatively analyze the loss caused by the landslide disaster, thereby providing a decision-making basis for disaster prevention and relief.

What is claimed is:

1. A landslide recognition method based on Laplacian pyramid remote sensing image fusion, comprising:
   S1, performing original remote sensing image reconstruction based on extracted remote sensing image local features and remote sensing image global features through a Laplacian pyramid fusion module to generate a fused image, wherein an implementation process of the S1 comprises:
      S11, designing an image block feature extractor according to a size of each of remote sensing images, dividing each of the remote sensing images into a series of sub-images, and inputting the series of sub-images into the image block feature extractor to perform feature extraction on each of the series of sub-images and thereby complete extraction of the remote sensing image local features;
      S12, downscaling each of the remote sensing images of different sources by downsampling once to obtain a downscaled image with a size being one quarter of the size of the remote sensing image, encoding the downscaled image, repeatedly performing the operations of downscaling and encoding until a resultant downscaled image has a size same as a size of each of the series of sub-images in the S11, and upsampling features corresponding to different scales to the size of the remote sensing image to thereby obtain the extracted remote sensing image global features; and
      S13, inputting the remote sensing image local features extracted in the S11 and the remote sensing image global features extracted in the S12 into the Laplacian pyramid fusion module, and performing the original remote sensing image reconstruction through an image reconstruction autoencoder network;
   S2, constructing a deep learning semantic segmentation model through a semantic segmentation network based on parallel structure,
      wherein a main body of the semantic segmentation network comprises four phases, one stream is added at bottom when each time one phase is expanded, each stream of the semantic segmentation network represents a processing of high-resolution to low-resolution has been operated, a next stage is composed of a previous stream and another stream reduced to half in size, and multi-resolution fusion and information exchange are performed before each time of the downsampling;
      wherein all low-resolution features are upsampled to a resolution same as that of a first stream to obtain upsampled features, and the upsampled features are concatenated to obtain a feature map for semantic segmentation; and an implementation process comprises:
      S21, reducing an input image in resolution to ¼ of its original size through a convolution with a step size of 2 as input of a first phase of the four phases, a resolution of a bottommost stream after subsequent three times of resolution reduction being 1/32 of the original size, and a fourth phase of the four phases comprising four feature maps with different resolutions being ¼, ⅛, 1/16 and 1/32 of the original size;
      S22, in the fourth phase, fusing feature representations of four different resolutions to realize image feature enhancement and restoring the feature representations of four different resolutions to the same resolution of the first phase by upsampling to obtain restored four feature representations with the same resolution, wherein the same resolution is ¼ of the original size; and
      S23, concatenating the restored four feature representations with the same resolution obtained in the fourth phase through a 1×1 convolution, and then obtaining a segmentation result with the same size as input of the whole semantic segmentation network through four times of upsampling;
   S3, labeling a place where landslide disaster occurs and a place where landslide disaster does not occur in the fused image through an image labeling tool to obtain a dataset of landslide disaster label map; and
   S4, training the deep learning semantic segmentation model by the dataset obtained in the S3, and storing the deep learning semantic segmentation model when a loss curve of the deep learning semantics segmentation model is fitted and a landslide recognition accuracy of remote sensing image of the deep learning semantics segmentation model meets a requirement by modifying a structure of the semantic segmentation network and adjusting parameters of the deep learning semantics segmentation model.

2. The landslide recognition method based on Laplacian pyramid remote sensing image fusion as claimed in claim 1, wherein an implementation process of the S3 comprises:

S31, performing preprocessing works including radiometric calibration, geometric correction and logarithmic conversion on a selected remote sensing image pair;

S32, labeling the fused image through the image labeling tool to label the place where landslide disaster occurs and the place where landslide disaster does not occur in the fused image, and thereby obtaining a landslide disaster label map; and S33, cropping the landslide disaster label map obtained after the labeling according to a channel size of the semantic segmentation network, and deleting a label not including landslide in the landslide disaster label map to obtain the dataset of landslide disaster label map.

\* \* \* \* \*